United States Patent [19]
Lais et al.

[11] Patent Number: 5,336,119
[45] Date of Patent: Aug. 9, 1994

[54] DRIVE UNIT FOR RELATIVELY SMALL WATERCRAFT

[75] Inventors: Siegfried Lais, Spay; Gerd Krautkrämer; Stefan Huth, both of Boppard; Stephan Schneider, Koblenz, all of Fed. Rep. of Germany

[73] Assignee: Schottel-Werft Josef Becker GmbH & Co. KG, Spay am Rhein, Fed. Rep. of Germany

[21] Appl. No.: 932,712

[22] Filed: Aug. 19, 1992

[30] Foreign Application Priority Data

Aug. 25, 1991 [DE] Fed. Rep. of Germany ....... 4127940

[51] Int. Cl.$^5$ ............................................. B60L 11/00
[52] U.S. Cl. ......................................... 440/6; 440/78; 440/900
[58] Field of Search ................ 440/6, 7, 900, 78, 83, 440/75, 53

[56] References Cited

U.S. PATENT DOCUMENTS 2,794,410 6/1957 Oliver et al. ................. 440/6

FOREIGN PATENT DOCUMENTS 637548 8/1983 Switzerland ............... 440/6

Primary Examiner—David A. Bucci
Assistant Examiner—Thomas J. Brahan
Attorney, Agent, or Firm—Levine & Mandelbaum

[57] ABSTRACT

A drive unit for a relatively small watercraft has a cylindrical underwater partial housing which carries, at one end, an electric motor to be operated photovoltaically, with which a propeller is arranged, at the other end, in such a way that it is seated on a shaft which is rotatably mounted in parallel relationship to the motor output shaft. The propeller shaft is supported in non-lubricated bearings in a partial housing connected to the cylindrical underwater partial housing. A toothed belt drive, having a toothed belt extending from the motor-side open end of the cylindrical underwater partial housing into the cylindrical underwater partial housing, to the motor shaft, is inserted between the motor output shaft and the propeller shaft. The assembled unit is passed, sealingly, through a bearing mounted in the bottom of the boat so that the assembled unit, in its entirety, is mounted fully rotatably around the longitudinal axis of the cylindrical partial housing, in the watercraft, without using a stop to limit rotary movement, such that the assembled unit can be arranged inboard, except for the propeller, the partial housing accommodating the propeller shaft, and the propeller-side section of the cylindrical underwater partial housing.

6 Claims, 1 Drawing Sheet

DRIVE UNIT FOR RELATIVELY SMALL WATERCRAFT

BACKGROUND OF THE INVENTION

The present invention pertains to a drive unit for relatively small watercraft.

SUMMARY OF THE INVENTION

The task of the present invention is to design such a unit in such a way that it will have the lowest emissions possible in order to be able to be used to drive relatively small boats in particularly sensitive areas, e.g., to drive boats which are used for inspecting drinking water reservoirs. The entire drive unit shall be able to be manufactured independently from the watercraft and to be associated with a watercraft in a simple manner; it shall require little maintenance, and it shall be able to operate without lubricating oil and grease in the interest of reduced environmental pollution.

DESCRIPTION OF THE PREFERRED EMBODIMENT

Figure 1:
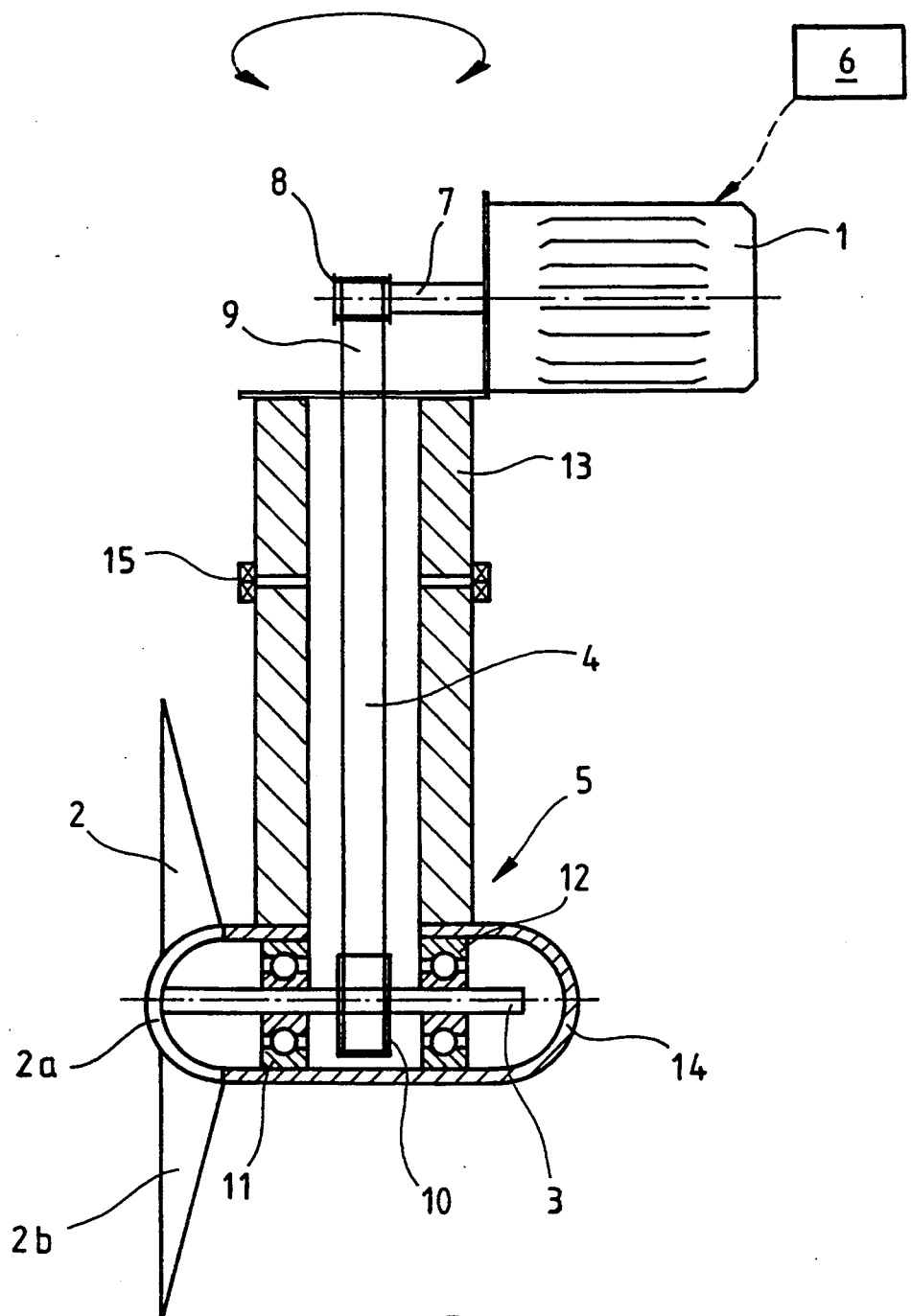
FIG. 1 is a sectional elevation view of the apparatus of the preferred embodiment of the invention.

The characteristics of the unit according to the present invention will become apparent from the patent claims. The unit will be described below on the basis of the drawing.

The essential parts of the drive unit are an electric motor 1, a propeller 2 driven by the electric motor 1, a toothed belt drive 4 transmitting the drive power from the motor 1 to a propeller shaft 3, and a housing 5 that holds together the aforementioned parts.

The energy for the electric motor 1 is obtained from a photovoltaic device 6, which is represented as a schematic system component.

A toothed belt disk 8, which is coupled via a toothed belt 9 with a corresponding toothed belt disk 10, which in turn is fixedly mounted on the propeller shaft 3, is fixedly mounted on the drive shaft 7 of the electric motor 1. The propeller shaft 3 is mounted rotatably by means of two bearings 11, 12, which are displaced relative to one another in the direction of the longitudinal axis of the propeller shaft 3 and on opposite sides of the toothed belt disk 10.

The toothed belt 9 is introduced into the motor-side, open end of a cylindrical underwater partial housing 13 and is passed through the underwater partial housing 13 to the propeller shaft mounted toothed belt disk 10. The cylindrical underwater partial housing 13 is closed at the propeller-side end by a partial housing 14, which accommodates the propeller shaft 3 and its bearings 11, 12, and which adjoins the cylindrical partial housing 13 in a watertight manner and is itself watertight, and from which the propeller shaft 3 extends at one end, likewise in a watertight manner, in order for the propeller shaft to carry the propeller 2, which consists essentially of a hub 2a, which is in watertight contact with the partial housing 14, and attached propeller blades 2b, outside the housing.

The bearings 11, 12 of the propeller shaft 3 are special dry-running anti-friction bearings made of special steel or plastic, which are also maintenance-free, in addition to being lubricant-free. Therefore, there are no emissions whatsoever during use, and the drive is environmentally neutral.

A thermoplastic acetal copolymer, which meets the following criteria, is suggested as the material for the two partial housings 13, 14:
  physiologically harmless,
  corrosion-resistant,
  low density at high material strength,
  resistant to algal and barnacle growth regardless of the duration of use,
  absolute absence of electrolytic corrosion, and
  high degree of acoustic muffling.

The drive unit according to the present invention is intended for installation in a watercraft with the longitudinal axis of the cylindrical partial housing 13, which passes through the bottom 16 of the watercraft in a selected area, vertical. The drive unit is provided, in this area, with a bearing 15, which permits the passage of the housing through the bottom of the watercraft in a watertight manner and such that the entire assembly unit can be fully steered unlimitedly, without stopping, around the longitudinal axis of the cylindrical partial housing 13. Thus it delivers full thrust in any desired steering position. The portion of the cylindrical partial housing 13 under the bearing 15, the partial housing 14 and the propeller 2, are located outboard in the assembled state, and the part of the drive unit above the bearing 15 is located inboard.

Despite the absence of oil and grease, high mechanical efficiency of power transmission is achieved by optimization of friction in the dynamic belt drive, by mounting the propeller shaft in anti-friction bearings, and by the thrust-optimized design of the propeller. This optimization of the mechanical efficiency makes it possible to convert available solar energy for sufficient driving performance.

Due to the photovoltaic energy supply, the use of an electric motor as the driving engine, and the design of the drive, the drive system guarantees extremely low-noise operating behavior. This is favorable, especially for people seeking the quiet of recreational areas, in the case of use for recreational purposes, as well as for the worthwhile goal of protecting the environment, i.e., the recreational area. The design of the drive unit according to the present invention is characterized by
  high degree of muffling due to the use of plastic,
  efficiency-optimized belt drive,
  no meshing of toothed parts,
  thrust-optimized propeller,
  optimal arrangement of bearings,
  minimizing the number of rotating components.

In connection with an electric motor as the driving engine, and especially with the photovoltaic energy supply, the drive forms an emission-free, ecologically completely acceptable overall system.

Due to optimization of its efficiency, the drive is especially suitable for solar energy supply (good driving performance despite low irradiated energy density); in the case of conventional energy supply from the mains, it helps save resources.

What is claimed is:

1. A drive unit for mounting in the bottom of a small watercraft comprising
  a cylinder having a sealed bearing on its circumference for enabling the cylinder to be rotatably mounted in the bottom of the watercraft, in fluid-tight relationship therewith, with one end inboard and the other end outboard of the watercraft, said cylinder being completely rotatable about a vertical axis, a propeller housing mounted adjacent the outboard end of the cylinder, a propeller shaft having non-lubricated bearings thereon, for rotatably mounting the propeller shaft in the housing, a propeller mounted on one end of the propeller shaft, a toothed belt disk fixedly mounted on the propeller shaft, an electric motor mounted atop, and external to, the inboard end of the cylinder, the motor having an output shaft with a toothed belt disk mounted thereon, a toothed belt, within the cylinder, mounted about the toothed disks of the motor output shaft and the propeller shaft for transmitting torque from the motor to the propeller, whereby the watercraft can be quietly driven in any direction without emitting any substances into the water.

2. A drive unit according to claim 1 wherein the diameter of the cylinder is less than the normal distance from its axis to the motor.

3. A drive unit according to claim 1 wherein the propeller shaft bearings are made of antifriction steel.

4. A drive unit according to claim 1 wherein the propeller shaft bearings are made of antifriction plastic.

5. A drive unit according to claim 1 wherein the cylinder and propeller housing are joined to form an integral unit having a water-tight exterior and a single chamber wherein the belt passes between the propeller shaft and motor shaft, and further comprising a bearing mounted between the propeller shaft and propeller housing whereby the propeller is rotatably mounted with respect to the housing and the chamber is hermetically sealed from the exterior water.

6. A drive unit according to claim 1 wherein the cylinder and propeller housing are each made of a plastic material.

* * * * *